United States Patent [19]

Lucassen

[11] Patent Number: 4,488,539
[45] Date of Patent: Dec. 18, 1984

[54] SOLAR COLLECTOR UNIT

[75] Inventor: Wilhelmus H. P. Lucassen, Eindhoven, Netherlands

[73] Assignee: U.S. Philips Corporation, New York, N.Y.

[21] Appl. No.: 539,354

[22] Filed: Oct. 6, 1983

[30] Foreign Application Priority Data

Nov. 19, 1982 [NL] Netherlands ............... 8204482

[51] Int. Cl.³ ............................... F24J 3/02
[52] U.S. Cl. ..................... 126/433; 126/443
[58] Field of Search ............ 126/433, 434, 443, 448, 126/450; 165/104.12

[56] References Cited

U.S. PATENT DOCUMENTS

| 4,252,185 | 2/1981 | Kossen | 126/433 |
| 4,299,203 | 11/1981 | Skopp | 126/443 |

FOREIGN PATENT DOCUMENTS

| 2307232 | 11/1976 | France | 126/433 |
| 166445 | 10/1982 | Japan | 126/443 |

Primary Examiner—James C. Yeung
Attorney, Agent, or Firm—Rolf E. Schneider

[57] ABSTRACT

Apparatus for collecting and transferring solar heat to a medium to be heated comprises a heat pipe having an evaporator part and a condenser part; a solar heat absorber plate in thermally conductive contact with the evaporator part; and an evacuated transparent envelope surrounding the absorber plate and the evaporator part. Means is provided on the condenser part for increasing its heat-transferring area. A duct section is included for the medium to be heated, such duct section being constituted by an inlet duct and an outlet duct separated by a wall having a first aperture. A second aperture is formed in the outer wall of the duct section, the second aperture having at least the same diameter as the first aperture and being in alignment therewith, the diameter of the second aperture corresponding to that of the transparent envelope. The heat pipe is positioned in the aligned apertures so that the transparent envelope is in sealing engagement with the second aperture and the heat-transferring area-increasing means extends through the first aperture. A wall surrounds the area-increasing means and engages the first aperture. The area-increasing means is so constructed that the medium to be heated can flow over such means from the inlet duct to the outlet duct.

2 Claims, 2 Drawing Figures

SOLAR COLLECTOR UNIT

This invention relates to a solar collector unit suitable for collecting solar heat and for transferring it to a medium to be heated, comprising a collector which includes an absorber plate arranged in thermally conductive contact with the evaporator part of a heat pipe which contains a heat-transporting medium, the absorber plate and the evaporator part being surrounded by an evacuated transparent envelope and the condenser part of the heat pipe projecting beyond the envelope and being provided with means which enlarges its heat-transferring area, the unit further comprising a duct section for the medium to be heated and the condenser part of the heat pipe of the collector being arranged inside this duct section.

A solar collector unit of this type is disclosed in U.S. Pat. No. 4,299,203. In this known solar collector unit, the condenser parts of the heat pipes of the collectors are in heat-exchanging contact with means which enlarge their heat-transferring areas. These means are constructed as disk-shaped fins extending at right angles to the condenser parts. Furthermore, the condenser parts are arranged in succession in the duct section in the direction of flow of the medium to be heated. This arrangement of the condenser parts results in a comparatively poor heat-exchange with the flowing medium to be heated. If the medium to be heated is a liquid, such an arrangement is satisfactory because a liquid can exchange a sufficient amount of heat with these condenser parts. However, for gaseous media, such as air, such an arrangement is no longer satisfactory because the heat exchange is then very poor due to the fact that the air mainly circulates around the heat exchangers.

The present invention has for its object to provide a solar collector unit having a construction such that the collectors can be assembled in a simple manner with the duct section for the medium to be heated, and such that the medium to be heated flows over the heat-transferring means of adjacent condenser parts in parallel.

The solar collector unit according to the invention is characterized in that the duct section comprises two adjacent ducts which are separated from one another by a wall and of which one constitutes an inlet duct and the other an outlet duct for the medium to be heated, the separating wall being provided with apertures each of which is aligned with an associated aperture of the same or larger diameter in the outer wall of the duct section to form therewith a pair of aligned apertures, the apertures in said outer wall having a diameter corresponding to that of the collector envelopes, and a collector being arranged in each pair of aligned apertures so that the envelope of the collector engages the outer wall of the duct section in a sealing manner, the means which enlarges the heat-transferring area of the condenser part of the heat pipe of each collector being surrounded by a wall which adjoins the boundary of the respective aperture in the separating wall and being so constructed that the medium to be heated can flow over such means from the inlet duct to the outlet duct.

In this manner, a solar collector unit is obtained in which, in the case of a unit comprising a plurality of collectors, the heat-transferring means of the condenser parts of the heat pipes of all the collectors are arranged parallel to each other and the medium to be heated flows over these means in the axial direction with respect to the condenser parts. This arrangement guarantees that the heat-transferring means of each condenser part is thermally loaded in the same manner, which ensures an optimum transfer of heat to the medium to be heated.

In this construction, the collectors can be inserted from the exterior into the duct section, the heat-transferring means of each condenser part fitting into one of the apertures in the separating wall and the envelope of each collector fitting in a sealing manner into the associated aperture in the outer wall of the duct section.

According to a favourable embodiment, the means which enlarges the heat-transferring area of the condenser part of the heat pipe of each collector is constituted by fins, pins or wires extending substantially radially from the surface of the condenser part.

The invention will now be described more fully with reference to the accompanying drawings in which.

Figure 1:
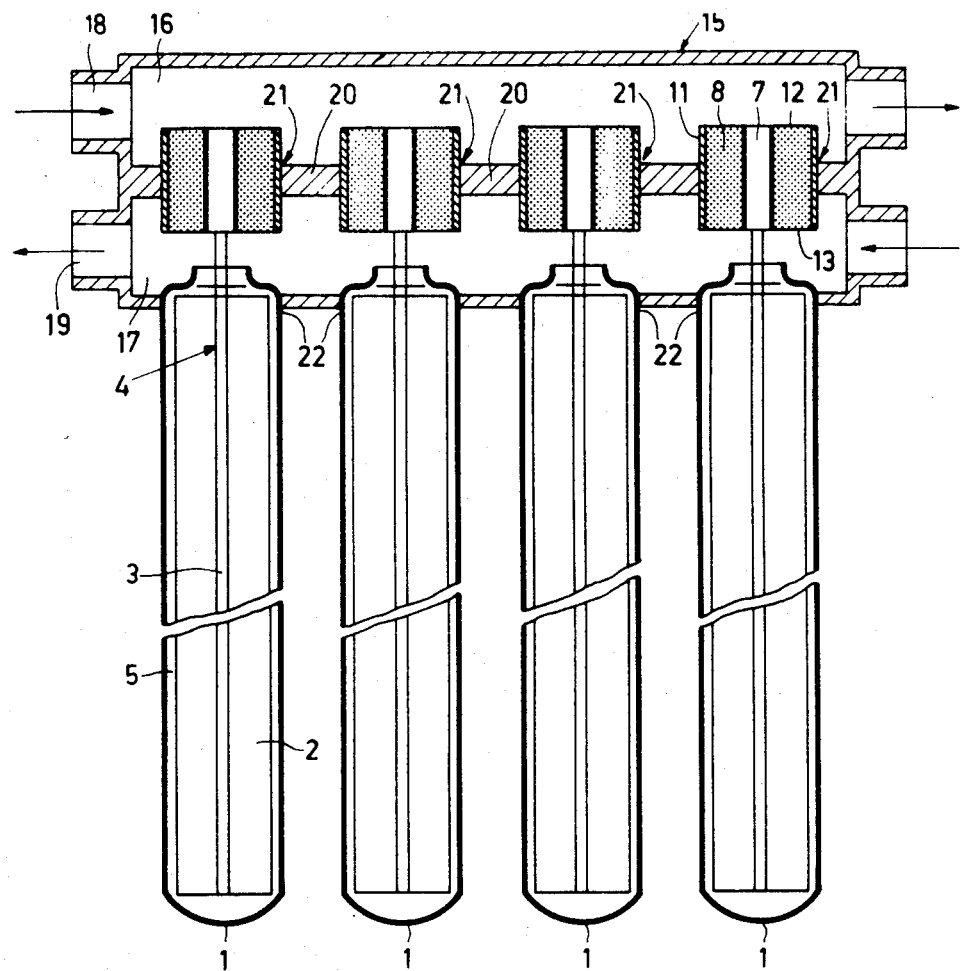
FIG. 1 shows diagrammatically in sectional view an embodiment of a solar collector unit according to the invention.

In FIG. 1, reference numeral 1 denotes each of a number of solar collectors. Each of these collectors comprises an absorber plate 2, which may be provided with a surface layer for selectively absorbing the solar radiation. The absorber plate 2 is in thermally conductive contact with the evaporator part 3 of a heat pipe 4, which contains a heat-transporting medium. The absorber plate 2 and the evaporator part 3 are surrounded by a transparent envelope 5 in which a sub-atmospheric pressure prevails.

Figure 2:
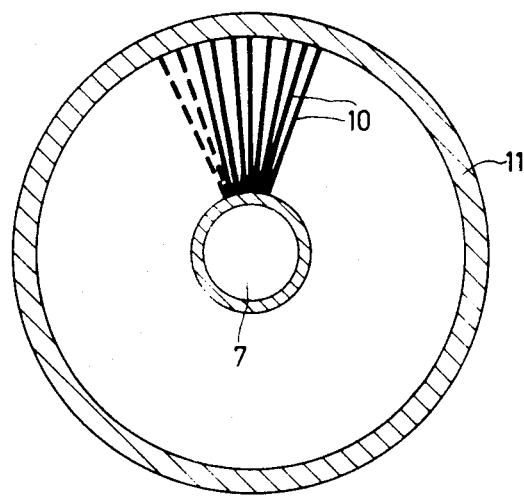
FIG. 2 is a transverse sectional view on an enlarged scale of the condenser part of a heat pipe of the collector unit of FIG. 1 and the means which enlarges the heat-transferring area of the condenser part.

The condenser part 7 of the heat pipe 4 of each collector 1 projects beyond the envelope 5 and is provided with means 8 which enlarges its heat-transferring area. The construction of such means is not shown in detail in FIG. 1 but may be constituted by parts of good thermal conductivity which permit a flow in the axial direction with respect to the condenser part 7. FIG. 2, by way of example, shows these parts constructed as fins 10 which extend radially from the surface of the condenser part 7. At its outer side the means 8 is bounded by an outer wall 11 so that circulation is possible only via the ends 12 and 13.

Instead of fins 10, the heat-transferring means 8 may comprise pins or wires which are in good thermal contact with the respective condenser part 7 and adequately fill the space between the condenser part and the outer wall 11 and which preferably extend radially from the condenser part.

The solar collector unit further comprises a duct section 15, which is constituted by two adjacent ducts 16 and 17, one of which serves as an inlet duct 18 and the other as an outlet duct 19 for the medium to be heated. The ducts 18 and 19 are respectively formed at both ends so that they can be readily connected in series with other solar collector units or with a further system through which the medium to be heated circulates. It is also possible to seal the collector unit at one end.

The two ducts are separated from one another by a wall 20 which is provided with a number of apertures 21. Each of the apertures 21 is aligned with an associated aperture 22 in the outer wall of the duct section 15 to form therewith a pair of aligned apertures, the diameter of the apertures 22 being equal to or slightly larger than that of the apertures 21.

A collector 1 is inserted into each pair of aligned apertures 21, 22. The diameter of the envelope 5 of each collector is such that the envelope fits into the respective aperture 22 in a sealing manner. Also, the outer wall 11 of the heat-transferring means 8 of each collector fits into the respective aperture 21 in a sealing manner.

The operation of this solar collector unit is as follows.

Incident solar radiation causes the temperature of the absorber plates 2 to increase. As a result, the temperature of the evaporator parts 3 of the heat pipes 4 also increases and the heat-transporting medium contained therein evaporates. The vapour formed flows to the condenser parts 7 and condenses there while giving up heat.

This causes the temperature of the heat-transferring means 8 to increase.

Cold medium to be heated is supplied via the inlet duct 18. This medium to be heated flows over the heat-transferring means 8 in the axial direction while absorbing heat, and then leaves the unit again via the outlet duct 19.

Thus, a solar energy collector unit is obtained in which substantially equal quantities of medium to be heated flow through the heat-transferring means 8 of the collectors so that an optimum heat exchange between the medium to be heated and the condenser parts of the heat pipes of the collectors is obtained, as a result of which this unit is particularly suitable for gaseous media, such as air.

Due to the described construction, the duct section 15 and the collectors 1 can be assembled in a comparatively simple manner.

What is claimed is:

1. Apparatus for collecting and transferring solar heat to a medium to be heated, which comprises a heat pipe having an evaporator part and a condenser part; a solar heat absorber plate in thermally conductive contact with the evaporator part; an evacuated transparent envelope surrounding the absorber plate and the evaporator part; means on the condenser part for increasing its heat-transferring area; a duct section for the medium to be heated, said duct section being constituted by an inlet duct and an outlet duct separated by a wall having a first aperture; a second aperture in the outer wall of the duct section, said second aperture having at least the same diameter as the first aperture and being in alignment therewith, the diameter of the second aperture corresponding to that of the transparent envelope; the heat pipe being positioned in the aligned apertures so that the transparent envelope is in sealing engagement with the second aperture and the heat-transferring area-increasing means extends through the first aperture; and a wall surrounding said area-increasing means and engaging the first aperture; the area-increaasing means being so constructed that the medium to be heated can flow over such means from the inlet duct to the outlet duct.

2. The apparatus according to claim 1, in which the heat-transferring area-increasing means is constituted by fins, pins or wires extending substantially radially from the condenser part.

* * * * *